United States Patent
Høydal et al.

(10) Patent No.: US 6,544,420 B1
(45) Date of Patent: Apr. 8, 2003

(54) TUBE APPARATUS FOR OUTLET OF LIQUID FROM A CONTAINER

(75) Inventors: Jan Høydal, Jørpeland (NO); Per Farstad, Loddefjord (NO)

(73) Assignee: Den Norske Stats Oljeselskap A.S., Stavanger (NO)

( * ) Notice: Subject to any disclaimer, the term of this patent is extended or adjusted under 35 U.S.C. 154(b) by 0 days.

(21) Appl. No.: 09/720,621

(22) PCT Filed: Jun. 17, 1999

(86) PCT No.: PCT/NO99/00201
§ 371 (c)(1),
(2), (4) Date: Feb. 28, 2001

(87) PCT Pub. No.: WO00/00260
PCT Pub. Date: Jan. 6, 2000

(30) Foreign Application Priority Data

Jun. 29, 1998 (NO) .............................. 19983018

(51) Int. Cl.[7] .................................................. C02F 1/40
(52) U.S. Cl. ..................................... 210/532.1; 210/540
(58) Field of Search .................. 210/122, 242.1, 210/513, 532.1, 538, 540

(56) References Cited

U.S. PATENT DOCUMENTS

| | | | | |
|---|---|---|---|---|
| 1,032,458 A | * | 7/1912 | White ........................ 210/540 |
| 1,644,248 A | * | 10/1927 | Goldman ................... 210/242.1 |
| 2,957,579 A | * | 10/1960 | McCombie ................ 210/242.1 |
| 3,109,812 A | * | 11/1963 | McAulay et al. ......... 210/242.1 |
| 4,272,257 A | | 6/1981 | Ellion et al. ................. 55/38 |
| 4,892,666 A | * | 1/1990 | Paulson ....................... 210/540 |
| 5,118,412 A | * | 6/1992 | Schmidt ...................... 210/122 |
| 6,251,266 B1 | * | 6/2001 | Gannon et al. ............. 210/122 |

FOREIGN PATENT DOCUMENTS

| | | |
|---|---|---|
| EP | 128122 | * 12/1984 |
| GB | 2 270 009 | 3/1994 |
| WO | 92/03383 | * 3/1992 |
| WO | 96/31662 | 10/1996 |
| WO | 97/14646 | 4/1997 |

* cited by examiner

Primary Examiner—Christopher Upton
(74) Attorney, Agent, or Firm—Foley & Lardner

(57) ABSTRACT

A tube apparatus for outlet of liquid from a container, adapted to receive at least two different fluids with intermediate interface(s), where liquid outlet openings are located above and/or underneath the interface(s). At least one tube member is adapted to have a substantially horizontal position in the container and is provided with at least two liquid outlet openings. A collecting tube communicates with each tube member and serves to lead liquid out of the container. Immediately under and/or over each liquid outlet opening there is provided a plate-shaped flow control element which extends approximately horizontally in all directions with respect to the liquid outlet opening concerned.

10 Claims, 3 Drawing Sheets

US 6,544,420 B1

TUBE APPARATUS FOR OUTLET OF LIQUID FROM A CONTAINER

RELATED APPLICATIONS

This is a national stage filing of PCT Application Number PCT/NO99/00201 filed Jun. 17, 1999.

FIELD OF THE INVENTION

This invention relates to a tube apparatus for discharge of liquid from a container, in particular a separation tank, adapted to receive at least to different fluids with one or more intermediate boundary layers, where liquid outlet openings are located above and/or under the boundary layer(s).

A common use for such a liquid outlet is for draining at the bottom of a container. The tube apparatus according to the invention has primarily been developed for draining the water phase in an oil-water separator. However the apparatus is also well suited for use in two-phase separators with low liquid levels. As already indicated above there can in this connection generally be the question of more than two different liquids or fluid phases, since it can also be contemplated to employ the tube apparatus between two boundary layers in such a case with three or (more) different liquids, or the more interesting case of two liquids and a gas phase.

Conventional designs of outlet arrangements for liquid from containers and tanks are as a rule based on a single outlet at one point. This involves drawbacks related to strong local draining effects in the vicinity of the outlet opening. Thus entraining of liquid from surrounding portions of the container will very easily occur, so that outflow and mixing of different liquids or phases in the boundary layer will result. The invention aims at substantial improvements in this respect.

In practical cases of mounting of a tube apparatus according to the invention in a container, the outlet openings will normally be well elevated above the bottom of the container. A result of this is that entraining of particles and bottom deposits such as sand, from the region at the bottom will be prevented, which apparently is an advantage compared to an outlet opening located close to or flush with the bottom of the container.

SUMMARY OF THE INVENTION

The present invention comprises, in one embodiment, a tube apparatus for outlet of liquid from a container, adapted to receive at least two different fluids with intermediate interface(s), where liquid outlet openings are located above and/or under the interface(s). This tube apparatus comprises: (1) at least one tube member adapted to have a substantially horizontal position in the container and provided with at least two liquid outlet openings; and (2) a collecting tube that communicates with each tube member and serves to lead liquid out of the container, whereby immediately under and/or over each liquid outlet opening there is provided a substantially plate shaped flow control element which extends approximately horizontally in all directions in relation to the liquid outlet opening concerned.

The flow control elements of the tube apparatus have their largest extension out from the associated liquid outlet opening straight forward thereof. At least one of the flow control elements can be common to two or more of the liquid outlet openings. The collecting tube is adapted to stand approximately vertical in the mounted position in the container.

In one application, each tube member comprises: (1) a circular cross section; (2) liquid outlet openings formed as part of the circular cross section and delimited partially by an edge which is adapted to extend approximately horizontally; (3) and flow control elements generally flush with each limiting edge concerned.

In another application, each tube member comprises: (1) a rectangular cross section with corresponding full liquid outlet openings; and (2) flow control elements positioned flush with an upper and/or lower wall of each tube member.

The apparatus can be principally symmetrical about a vertical axis with all liquid outlet openings of equal dimensions. Further, the tube members residing in the horizontal plane are connected in an H-configuration by a transverse tube which connects a middle portion of two tube members to the collecting tube.

Alternatively, the apparatus can be asymmetrical about a vertical axis with all of the liquid outlet openings adjusted in size so that all of the liquid outlet openings will have approximately the same liquid flow volume.

Within the framework of the invention there may also be contemplated embodiments with two or more tube members each having only one liquid outlet opening, for example a configuration with three tube members extending each in its direction from a common collecting tube and having an associated liquid outlet opening at the outer free end of each tube member. By distributing a number of liquid outlet openings over a larger area, combined with associated flow control elements, adjacent boundary layers between different liquids or gases will be influenced to a negligible degree during operation. This invention seeks to implement this distribution of outlets with flow control elements to achieve the stated advantages.

The arrangement of one or more tube members and two or more liquid outlet openings can in central embodiments according to the invention, comprise tube members having each two liquid outlet openings. Within the framework of the invention, however, there may also be contemplated embodiments with two or more tube members each having only one liquid outlet opening, for example a configuration with three tube members extending each in its direction from a common collecting tube and having an associated liquid outlet opening at the outer free end of each tube member.

With a tube apparatus according to the invention mounted in a container or separator tank particularly good draining properties are obtained. By distributing a number of liquid outlet openings, for example 3, 4 or more openings, over larger area or portions of the container, combined with associated flow control elements, one (or two) adjacent boundary layers between two different liquids will be influenced to a negligible degree during operation. In the typical case of a boundary surface lying somewhat above the outlet openings, it is more specifically liquid flow directed downwards from the region at the boundary surface that is prevented. In actual practice this involves that for example in an oil-water separator the boundary surface or interface between oil and water can be positioned very close to the outlet openings without any risk of entraining of oil with the water during outflow. In a corresponding manner entraining of gas is prevented when a two-phase separator is concerned.

BRIEF DESCRIPTION OF THE DRAWINGS

In the following description, the invention will be explained with reference to the drawings where.

DETAILED DESCRIPTION OF THE PREFERRED EMBODIMENT

Figure 1:
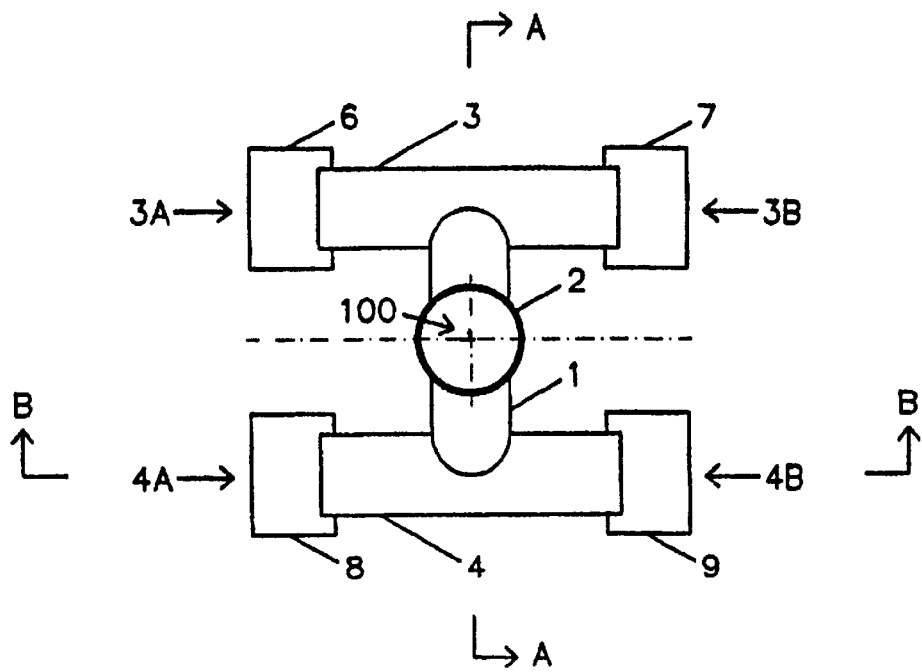
FIG. 1 shows a symmetrical configuration of the tube apparatus with an H-shape in top view.
Figure 2:
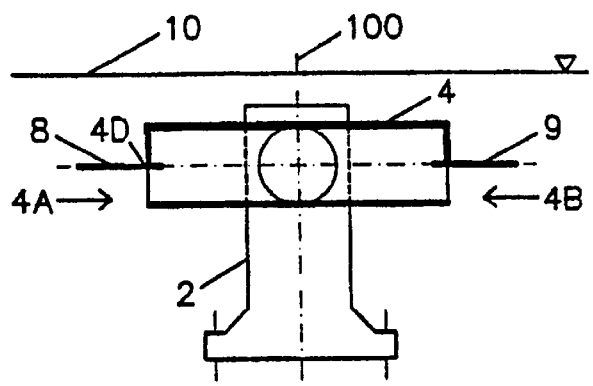
FIG. 2 shows the apparatus of FIG. 1 in a cross-sectional view according to the line B—B in FIG. 1.
Figure 3:
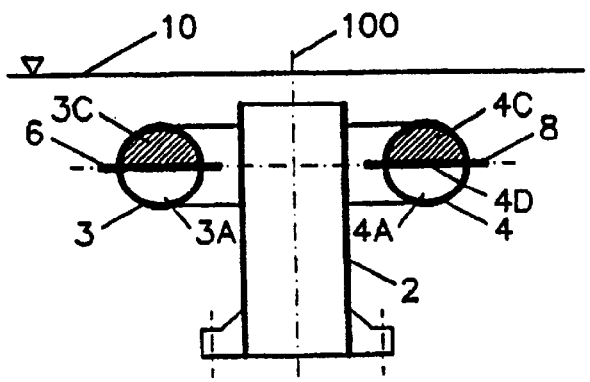
FIG. 3 shows the apparatus of FIG. 1 in a cross-sectional view according to the line A—A in FIG 1, FIG. 4 in contrast to the symmetrical configuration in FIG. 1, shows an asymmetric tube apparatus in top view, FIG. 5 in a cross-sectional view corresponding to FIG. 2, shows an embodiment of the tube apparatus intended for positioning the liquid outlet openings above liquid interface, FIG. 6 in a cross-sectional view corresponding to FIG. 2, shows an embodiment of the tube apparatus intended for positioning the liquid outlet openings between two interfaces in a container.

In the embodiment of the tube apparatus as seen from FIGS. 1, 2 and 3, there are incorporated two tube members 3 and 4, each of which has two liquid outlet openings, namely 3A and 3B as well as 4A and 4B, respectively. This embodiment comprises a symmetrical arrangement where four liquid outlet openings are located at the same distance from a central, vertical axis 100, and have the same orientation with respect thereto. An intermediate portion of each tube member 3 and 4 is connected to a transverse tube 1, which in turn communicates with a collecting tube 2 adapted to carry liquid out of the container concerned. In this embodiment, the collecting tube 2 stands vertically and has a flange connection at its lower end for transfer or connection out through a bottom outlet (not shown) of the container. An interface between two different fluids is shown at 10 in FIGS. 2 and 3.

The tube member 3 has an outlet opening 3A at one end and a second outlet opening 3B at the other end. In a corresponding way, tube member 4 has two liquid outlet openings 4A and 4B. This is a case of circular tube cross section in tube members 3 and 4, as will appear in particular from FIG. 3. As illustrated in FIG. 3, outlet openings 3A and 4A constitute a lower part of the complete tube cross section, as corresponding upper parts 3C and 4C of the cross section are closed with a plate. The limiting edge is illustrated at 4D for opening 4A. Preferably flush with the lower limiting edge of plate parts 3C and 4D, there are shown flow control elements 6 and 8, respectively. The shape and position of a total of four such flow control elements 6, 7, 8 and 9 is seen more fully from FIGS. 1 and 2. These flow control elements have a substantially rectangular plate shape, possibly with rounded corners.

At this point it is obvious that the rectangular shape can be modified very much, for example to or circular shape. As to the extension of plate elements 6, 7, 8 and 9 in relation to the associated liquid outlet openings 3A, 3B, 4A and 4B, there may also be quite large variations, but it is considered to be advantageous that the flow control elements have their largest dimensions horizontally or straight ahead of the opening concerned.

Based on an apparatus as explained above, it will be realized that this is to be located in the container concerned so that the liquid outlet openings 3A, 3B, 4A and 4B are positioned underneath the interface 10. Accordingly, the plate elements 6, 7, 8 and 9 lie between interface 10 and the respective openings, so that these in terms of liquid flow will be screened in relation to the interface. The arrows towards openings 4A and 4B in FIG. 2 thus illustrate how outflow trough these openings will influence the liquid layers up towards interface 10 only to a small degree.

In the symmetrical H-configuration according to FIG. 1, the four outlet openings 3A, 3B, 4A and 4B are of equal dimensions, so that the liquid volume discharged through each of these openings will be the same. This is related to the flow path from the respective openings through tube members 3 and 4 as well as the transverse tube 1 to collecting tube 2.

Figure 4:
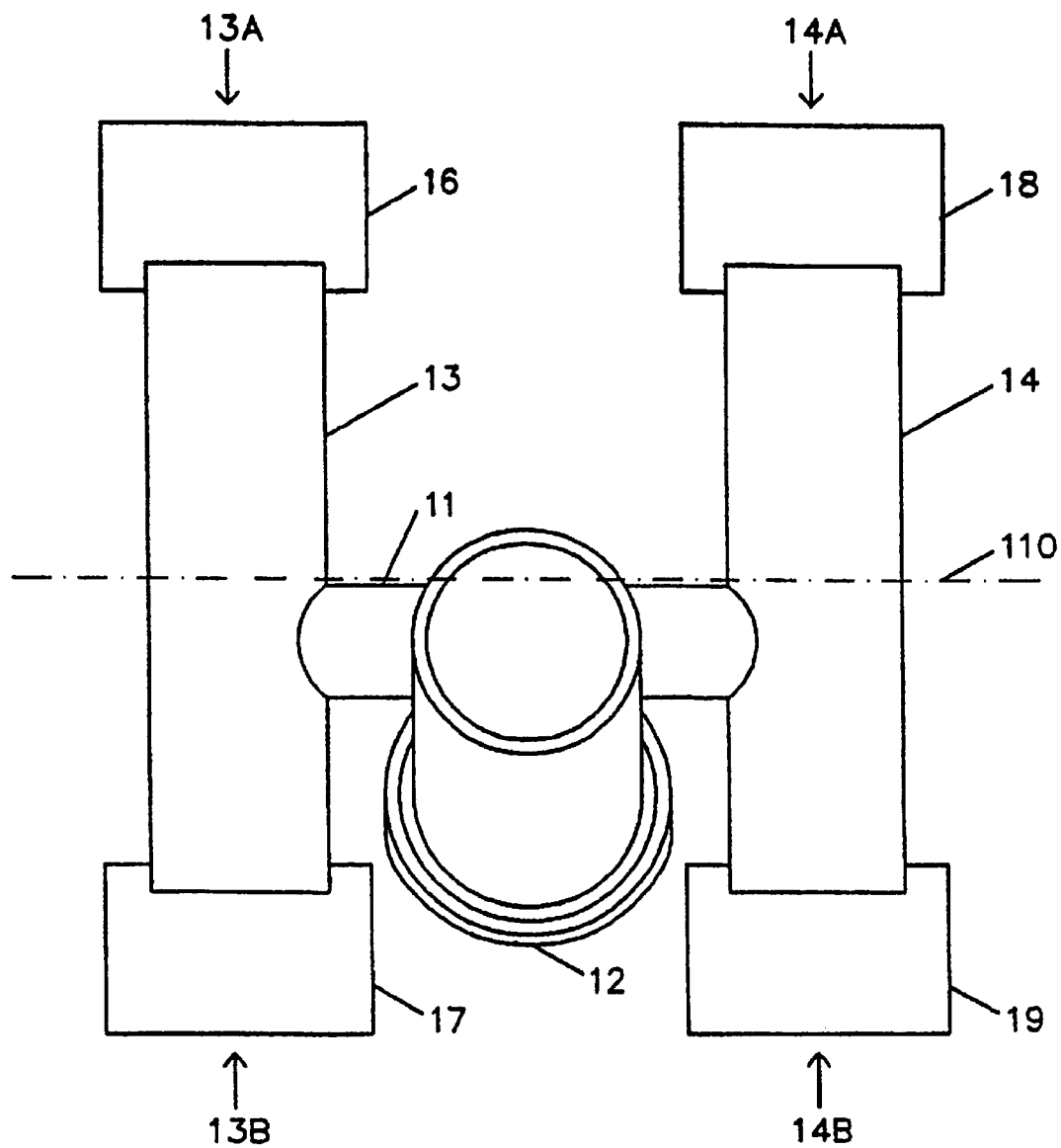

Unlike the symmetrical tube apparatus of FIGS. 1, 2 and 3 as just explained, FIG. 4 shows an example of an asymmetrical embodiment. Also here there are provided two tube members 13 and 14 with associated liquid outlet openings 13A, 13B, 14A, 14B, respectively. There is also provided a transverse tube 11 connecting the two tube members to a collecting tube 12. At each of the outlet openings there is shown a flow control element, as indicated at 16, 17, 18 and 19. These elements here have a rectangular plate shape resembling the flow control elements in FIGS. 1–3.

It appears from FIG. 4 that tube members 13 and 14 with their associated outlet openings are somewhat skewed in relation to collection tube 12. Collecting tube 12 penetrates the bottom of the container concerned, somewhat inclined with respect to the central line 110 along the bottom of the container which explains this asymmetrical arrangement. It is desirable however, that the four liquid outlet openings are positioned in pairs symmetrically in relation to the bottom of the container and thus to the central line 110. The apparatus may be implemented in a horizontal cylindrical container, the axis of which extends in parallel to the central line 110 mentioned above. From the geometrical relationships described here, it is seen that tube members 13 and 14 are adapted to lie substantially horizontally in the mounted position of the tube apparatus. In this configuration of the apparatus-the flow paths from openings 13B and 14B will be shorter than the flow paths from openings 13A and 14A, and consequentially the size of the openings is adjusted in order to compensate for this. Thus liquid outlet openings 13A and 14A must be larger than openings 13B and 14B in order that the flow contribution from each of the outlet openings shall be of equal magnitude.

Figure 5:
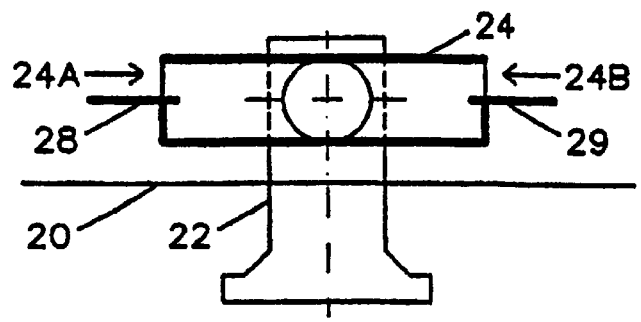

In the preceding figures, it has been a precondition that the interface (10 in FIGS. 2 and 3) lies higher than the outlet apparatus. FIG. 5 shows a case of the opposite arrangement, namely with an interface 20 at a lower level than a tube member 24 with associated liquid outlet openings 24A and 24B with their flow control elements 28 and 29. Therefore, these elements here have a screening effect with respect to fluid flow from the region at interface 20. Otherwise the embodiment of FIG. 5 can correspond to the one in FIGS. 1–3. Thus, there is shown a vertical collecting tube 22 corresponding to collecting tube 2 in FIGS. 1–3.

Figure 6:
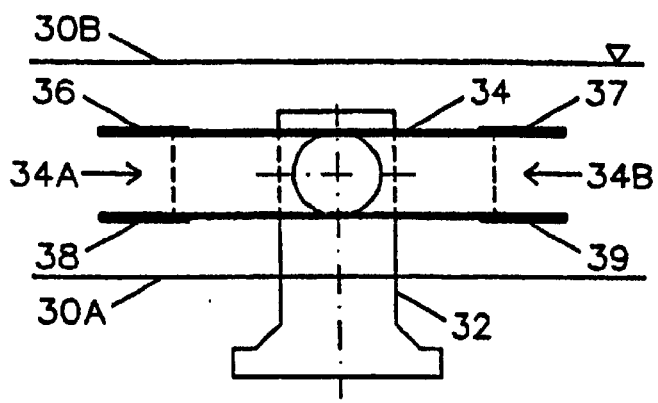

A further possible modification is illustrated in FIG. 6, where there is the case of two interfaces 30A and 30B, at whereby fluids above interface 30B, as an alternative, can be a gas phase. A collecting tube 32 here penetrates interface 30A and carries a tube member 34 so that this is localized between the interfaces 30A and 30B. Liquid outlet openings 34A and 34B in this embodiment have flow control elements both at the upper side and at the underside, as shown at 36 and 38 for opening 34A and at 37 and 39 for opening 34B. Thereby the openings will be screened with respect to both interfaces 30A and 30B, so that outflow of liquid will take place substantially from the liquid layers between interfaces 30A and 30B.

The cross-sectional shape of tube member 34 in FIG. 6 can be rectangular, so that plate elements 36–39 can be located and attached substantially flush with the upper and lower walls respectively of the rectangular tube member 34. Based on a symmetrical H-configuration as in FIG. 1, the outlet openings according to FIG. 6 can comprise the full rectangular cross section of tube member 34. In other words, all of the liquid outlet openings can be of the same shape and size.

Irrespective of the cross-sectional shape, it is also within the framework of the invention that the plane of the outlet openings can deviate from the vertical plane. A more or less downwards or upwards inclined orientation of the openings is also possible.

Figure 7:
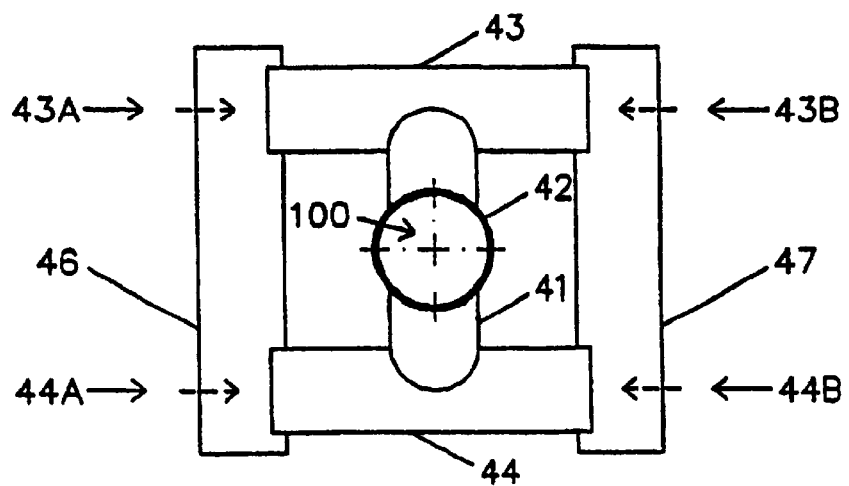
FIG. 7 shows a configuration of the tube apparatus with a specific embodiment of plate-shaped flow control elements.

Finally FIG. 7 also shows an essentially symmetrical H-configuration with collecting tube 42, transverse tube 41 and two tube members 43 and 44. Associated outlet openings are indicated with arrows at 43A, 43B and 44A, 44B, respectively. What is specific in the embodiment of FIG. 7 is that there is provided a common flow control element 46 for the openings 43A and 44A at one side and at the other side a common plate element 47 for the openings 43B and 44B. In certain respects such an embodiment can be advantageous, among other things, for the purpose of an extended area of the flow control elements as a whole. A large extension in this respect will be obtained by having a common plate element extending between and out from all outlet openings in the tube apparatus. The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined the claims appended hereto, and their equivalents.

What is claimed is:

1. A tube apparatus for outlet of liquid from a container, adapted to receive at least two different fluids with intermediate interface(s), where liquid outlet openings are located above and/or under the interface(s), comprising:
    at least one tube member disposed in a substantially horizontal position in the container and provided with at least two liquid outlet openings, whereby each said tube member comprises:
    a circular cross section;
    liquid outlet openings formed as part of the circular cross section and delimited partially by an edge which is adapted to extend approximately horizontally; and
    flow control elements that are substantially plate shaped and provided immediately under and/or over each liquid outlet opening, each of which extends approximately horizontally in all directions in relation to the liquid outlet opening concerned and that are generally flush with each limiting edge of the opening concerned; and
    a collecting tube that communicates with each tube member and serves to lead liquid out of the container.

2. A tube apparatus for outlet of liquid from a container, adapted to receive at least two different fluids with intermediate interface(s), where liquid outlet openings are located above and/or under the interface(s), comprising:
    at least one tube member disposed in a substantially horizontal position in the container and provided with at least two liquid outlet openings; and
    a collecting tube that communicates with each tube member and serves to lead liquid out of the container, whereby immediately under and/or over each liquid outlet opening there is provided a substantially plate shaped flow control element which extends approximately horizontally in all directions in relation to the liquid outlet opening concerned,
    whereby said apparatus is asymmetrical about a vertical axis and all said liquid outlet openings are sized so that all of the liquid outlet openings will have approximately the same liquid flow volume.

3. A tube apparatus for outlet of liquid from a container, adapted to receive at least two different fluids with intermediate interface(s), where liquid outlet openings are located above and/or under the interface(s), comprising:
    at least one tube member disposed in a substantially horizontal position in the container and provided with at least two liquid outlet openings; and
    a collecting tube that communicates with each tube member and serves to lead liquid out of the container, whereby immediately under and/or over each liquid outlet opening there is provided a substantially plate shaped flow control element which extends approximately horizontally in all directions in relation to the liquid outlet opening concerned,
    wherein each flow control element is in a fixed position within the container immediately under or over a liquid outlet opening.

4. An apparatus according to claim 3, whereby said flow control elements have their largest extension out from the associated liquid outlet opening straight forward thereof.

5. An apparatus according to claim 3, whereby each said tube member comprises:
    a rectangular cross section with corresponding full liquid outlet opening; and
    flow control elements positioned flush with an upper and/or lower wall of each said tube member.

6. An apparatus according to claim 3, whereby said apparatus is substantially symmetrical about a vertical axis and that all said liquid outlet openings are of equal dimensions.

7. An apparatus according to claim 6, wherein said tube members residing in the horizontal plane are connected in an H-configuration by a transverse tube which connects a middle portion of two tube members to the collecting tube.

8. An apparatus according to claim 3, whereby said collecting tube is adapted to stand approximately vertical in the mounted position in said container.

9. An apparatus according to claim 3, wherein at least one said flow control element is common to two or more of said liquid outlet openings.

10. The tube apparatus according to claim 3, wherein the liquid outlet openings are disposed symmetrically with respect to each other.

* * * * *